United States Patent
Leming et al.

(10) Patent No.: US 11,283,085 B1
(45) Date of Patent: Mar. 22, 2022

(54) LOW VOC INK COMPOSITIONS AND METHODS OF FORMING FUEL CELL SYSTEM COMPONENTS USING THE SAME

(71) Applicant: BLOOM ENERGY CORPORATION, San Jose, CA (US)

(72) Inventors: Andres Leming, Sunnyvale, CA (US); Olexa Stavila, Pleasanton, CA (US); Perry Scheetz, Santa Clara, CA (US); Lisa Adams, Castro Valley, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 16/811,098

(22) Filed: Mar. 6, 2020

(51) Int. Cl.
| | |
|---|---|
| *H01M 4/86* | (2006.01) |
| *H01M 4/90* | (2006.01) |
| *H01M 4/88* | (2006.01) |
| *H01M 8/1253* | (2016.01) |
| *H01M 8/0228* | (2016.01) |
| *H01M 8/0217* | (2016.01) |
| *H01M 8/028* | (2016.01) |
| *C04B 35/01* | (2006.01) |
| *C09D 11/54* | (2014.01) |
| *H01M 8/12* | (2016.01) |

(52) U.S. Cl.
CPC ......... *H01M 4/9033* (2013.01); *C04B 35/016* (2013.01); *C09D 11/54* (2013.01); *H01M 4/8657* (2013.01); *H01M 4/8668* (2013.01); *H01M 4/8828* (2013.01); *H01M 4/8842* (2013.01); *H01M 4/8885* (2013.01); *H01M 4/9066* (2013.01); *H01M 8/028* (2013.01); *H01M 8/0217* (2013.01); *H01M 8/0228* (2013.01); *H01M 8/1253* (2013.01); *H01M 2008/1293* (2013.01); *H01M 2300/0077* (2013.01); *H01M 2300/0094* (2013.01)

(58) Field of Classification Search
None
See application file for complete search history.

(56) References Cited

U.S. PATENT DOCUMENTS

| | | |
|---|---|---|
| 8,067,129 B2 | 11/2011 | Couse |
| 8,449,702 B2 | 5/2013 | Batawi et al. |
| 8,580,456 B2 | 11/2013 | Armstrong et al. |
| 8,748,056 B2 | 6/2014 | Batawi et al. |
| 8,852,825 B2 | 10/2014 | Batawi et al. |
| 9,246,184 B1 | 1/2016 | Batawi et al. |
| 9,356,298 B2 | 5/2016 | Oriakhi et al. |
| 9,583,771 B2 | 2/2017 | Parihar et al. |
| 9,923,211 B2 | 3/2018 | Batawi et al. |
| 10,249,883 B2 | 4/2019 | Leming et al. |
| 10,347,930 B2 | 7/2019 | El Batawi et al. |
| 2008/0096080 A1 | 4/2008 | Batawi et al. |
| 2009/0136821 A1 | 5/2009 | Gottmann et al. |

(Continued)

OTHER PUBLICATIONS

U.S. Appl. No. 16/508,108, filed Jul. 10, 2019, Bloom Energy Corporation.

(Continued)

*Primary Examiner* — Victoria H Lynch
(74) *Attorney, Agent, or Firm* — The Marbury Law Group PLLC

(57) ABSTRACT

A fuel cell system component ink includes a fuel cell system component powder, a solvent including propylene carbonate (PC), and a binder including polypropylene carbonate (PPC).

12 Claims, 5 Drawing Sheets

(56) References Cited

U.S. PATENT DOCUMENTS

| | | | |
|---|---|---|---|
| 2011/0183233 A1 | 7/2011 | Armstrong et al. | |
| 2012/0004301 A1 | 2/2012 | Batawi et al. | |
| 2012/0186976 A1* | 7/2012 | Laucournet | H01M 4/8621 |
| | | | 204/252 |
| 2013/0130146 A1 | 5/2013 | Batawi et al. | |
| 2014/0272114 A1 | 9/2014 | Oriakhi et al. | |
| 2014/0342267 A1 | 11/2014 | Parihar et al. | |
| 2015/0311538 A1 | 10/2015 | Batawi et al. | |
| 2016/0133947 A1 | 5/2016 | Leming et al. | |
| 2016/0285122 A1 | 9/2016 | El Batawi et al. | |
| 2016/0301082 A1 | 10/2016 | Oriakhi et al. | |
| 2018/0040909 A1 | 2/2018 | Gasda et al. | |
| 2018/0065093 A1* | 3/2018 | Takada | C08J 5/18 |
| 2019/0067705 A1 | 2/2019 | Gasda et al. | |
| 2019/0148331 A1* | 5/2019 | Honda | C09J 11/04 |
| | | | 156/379.6 |
| 2019/0181458 A1 | 6/2019 | Leming et al. | |
| 2020/0144646 A1* | 5/2020 | Hall | H01M 4/8832 |
| 2021/0083320 A1* | 3/2021 | Wachsman | C04B 35/6342 |

OTHER PUBLICATIONS

U.S. Appl. No. 16/209,080, filed Dec. 4, 2018, Bloom Energy Corporation.

* cited by examiner

LOW VOC INK COMPOSITIONS AND METHODS OF FORMING FUEL CELL SYSTEM COMPONENTS USING THE SAME

The present disclosure is directed generally to low VOC ink compositions and more specifically to ink compositions used to form fuel cell system components.

BACKGROUND

Components of fuel cell systems may be formed by applying corresponding component inks. However, prior art component inks may emit volatile organic compounds (VOC), which may complicate manufacturing and require expensive mitigation systems.

SUMMARY

According to various embodiments, fuel cell system component ink comprises a fuel cell system component powder, a solvent comprising propylene carbonate (PC), and a binder comprising polypropylene carbonate (PPC).

According to various embodiments, a method of forming a fuel cell system component comprises dispensing an ink onto a substrate to form an ink layer, and solidifying the ink layer to form the fuel cell system component. The ink comprising a fuel cell system component powder, a solvent comprising propylene carbonate (PC), and a binder comprising polypropylene carbonate (PPC).

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt %) and atomic percentages (at %) as used herein respectively refer to a percent of total weight or a percent of a total number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected directly to power conditioning equipment and the power (i.e., electricity) output of the stack or comprises a portion of a fuel cell column that contains terminal plates which provide electrical output.

Figure 1A:
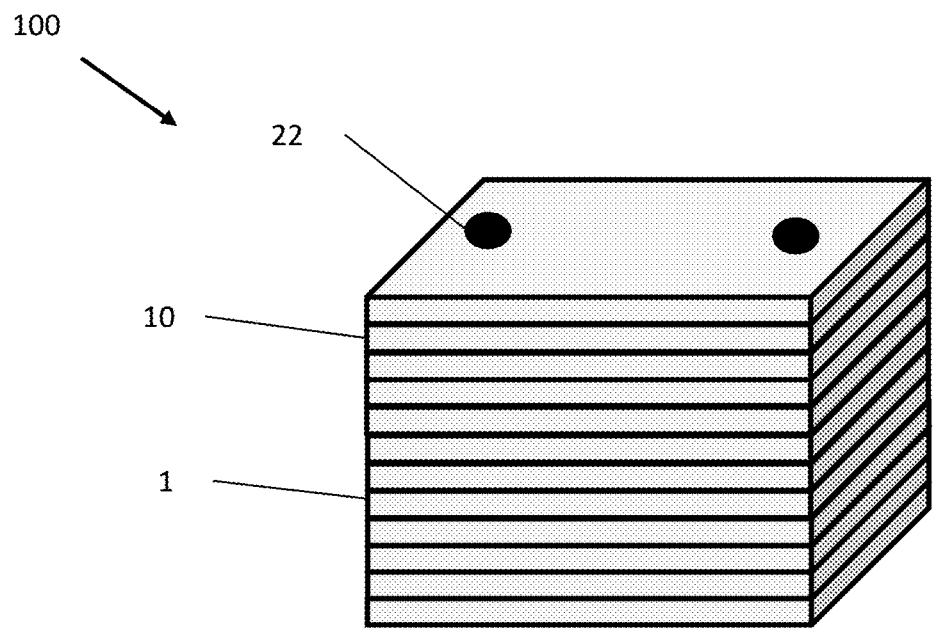
FIG. 1A is a perspective view of a SOFC stack, according to various embodiments of the present disclosure.
Figure 1B:
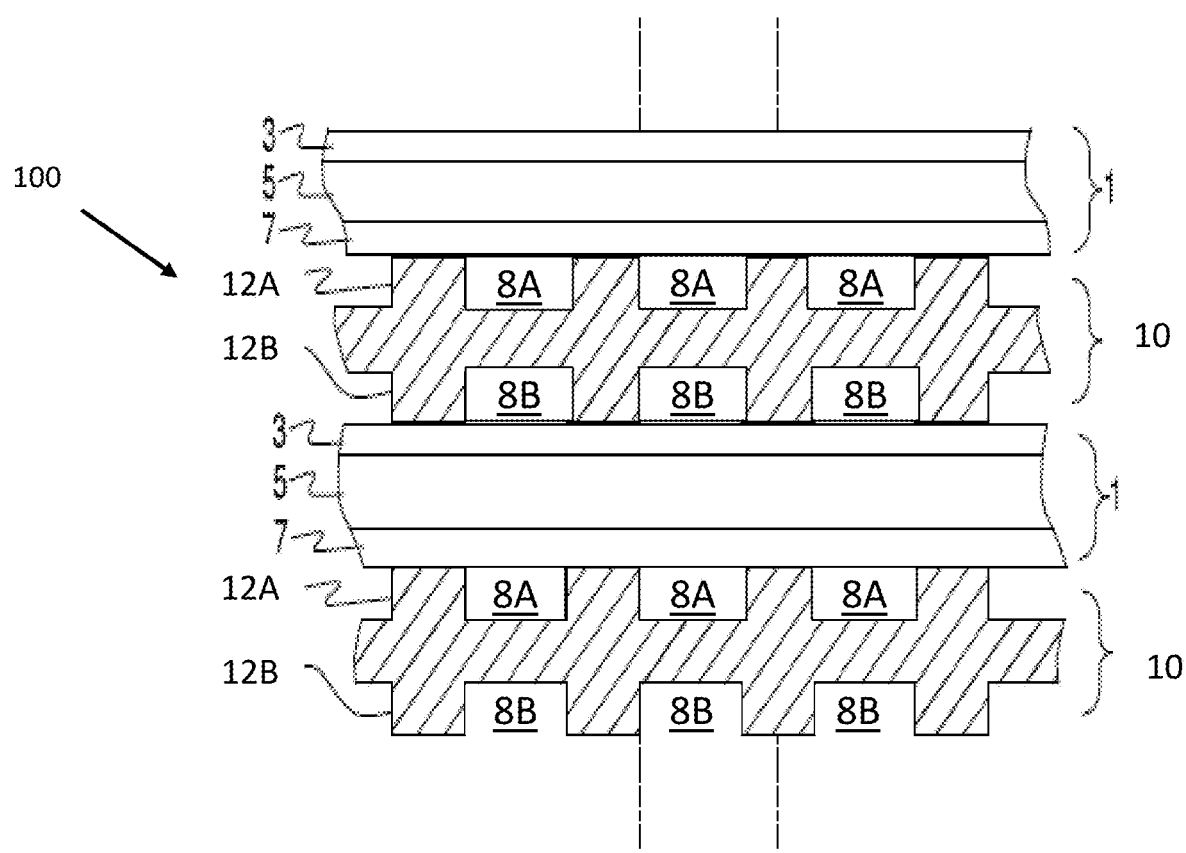
FIG. 1B is a cross-sectional view of a portion of the stack of FIG. 1A.

FIG. 1A is a perspective view of a fuel cell stack 100, and FIG. 1B is a sectional view of a portion of the stack 100, according to various embodiments of the present disclosure. Referring to FIGS. 1A and 1B, the stack 100 may be a solid oxide fuel cell (SOFC) stack that includes fuel cells 1 separated by interconnects 10. Referring to FIG. 1B, each fuel cell 1 comprises a cathode 3, a solid oxide electrolyte 5, and an anode 7.

Various materials may be used for the cathode 3, electrolyte 5, and anode 7. For example, the anode 7 may comprise a cermet layer comprising a metal-containing phase and a ceramic phase. The metal-containing phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the anode 7 may be annealed in a reducing atmosphere prior to operation of the fuel cell 1, to reduce the oxidized metal catalyst to a metallic state.

The metal-containing phase may consist entirely of nickel in a reduced state. This nickel-containing phase may form nickel oxide when it is in an oxidized state. Thus, the anode 7 is preferably annealed in a reducing atmosphere prior to operation to reduce the nickel oxide to nickel.

According to some embodiments, the metallic phase may include the metal catalyst and a dopant. For example, the metallic phase may be represented by Formula 1: $[D_xM_{1-x}]_yO$. In Formula 1, D is a dopant (in any oxidation state) selected from magnesium (Mg), calcium (Ca), titanium (Ti), aluminum (Al), manganese (Mn), tungsten (W), niobium (Nb), chromium (Cr), iron (Fe), vanadium (V), praseodymium (Pr), cerium (Ce), zirconium (Zr) or the like, or any combination thereof. In some embodiments, D may be Ca, Mg, and/or Ti. M is a metal catalyst selected from nickel (Ni), cobalt (Co), copper (Cu), or alloys thereof. X may range from about 0.01 to about 0.1, and y may range from about 1 to about 2. In other embodiments, x may range from about 0.01 to about 0.04. For example, x may be about 0.02 and y may be either 1 or 2.

Accordingly, the metallic phase may comprise from about 1 to about 10 atomic percent ("at %") of the metal oxide dopant and about 99 to about 90 at % of the metal catalyst. For example, the metallic phase may comprise from about 2 to about 4 at % of the metal oxide dopant and about 98 to about 96 at % of the metal catalyst, as manufactured before being reduced.

According to various embodiments, the anode 7 may include a metallic phase that includes NiO doped with MgO. For example, the metallic phase may include $Mg_xNi_{1-x}O$, wherein x is within the ranges described above. After anode manufacture and before or during fuel cell operation, the metallic phase is reduced by being exposed to a reducing ambient (e.g., fuel) at an elevated temperature (e.g., at a temperature ranging from about 750-950° C.). The reduced metallic phase may be represented by the formula $D_xM_{1-x}$.

The ceramic phase of the anode 7 may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like. In the YCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference. Yttria stabilized zirconia (YSZ) may be excluded from the ceramic phase of the anode 7.

The electrolyte 5 may comprise a stabilized zirconia, such as scandia-stabilized zirconia (SSZ), yttira-stabilized zirconia (YSZ), scandia-ceria-stabilized zirconia (SCSZ), scandia-ceria-yttria-stabilized zirconia (SCYSZ), or the like. Alternatively, the electrolyte 5 may comprise another ionically conductive material, such as a samaria-doped ceria (SDC), gadolinia-doped ceria (GDC), or yttria-doped ceria (YDC).

The cathode 3 may comprise a layer of an electrically conductive material, such as an electrically conductive perovskite material, such as lanthanum strontium manganite (LSM). Other conductive perovskites, such as lanthanum strontium cobaltite (LSC), lanthanum strontium cobalt manganite (LSCM), lanthanum strontium cobalt ferrite (LSCF), lanthanum strontium ferrite (LSF). $La_{0.85}Sr_{0.15}Cr_{0.9}Ni_{0.1}O_3$ (LSCN), etc., or metals, such as Pt, may also be used.

In some embodiments, the cathode 3 may comprise a mixture of the electrically conductive material and an ionically conductive material. For example, the cathode 3 may include from about 10 wt % to about 90 wt % of the electrically conductive material described above, (e.g., LSM, etc.) and from about 10 wt % to about 90 wt % of the ionically conductive material. Suitable ionically conductive materials include zirconia-based and/or ceria based materials. For example, the ionically conductive material may comprise scandia-stabilized zirconia (SSZ), ceria, and at least one of yttria and ytterbia. In some embodiments, the ionically conductive material may be represented by the formula:

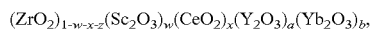

$(ZrO_2)_{1-w-x-z}(Sc_2O_3)_w(CeO_2)_x(Y_2O_3)_a(Yb_2O_3)_b$, wherein $0.09 \leq w \leq 0.11$, $0 < x \leq 0.0125$, $a+b=z$, and $0.0025 \leq z \leq 0.0125$. In some embodiments, $0.009 < x \leq 0.011$ and $0.009 \leq z \leq 0.011$, and optionally either a or b may equal to zero if the other one of a or b does not equal to zero.

The cathode 3 may also optionally contain a ceramic phase similar to the anode 7. The electrodes and the electrolyte may each comprise one or more sublayers of one or more of the above described materials.

Furthermore, if desired, additional contact or current collector layers may be placed over the cathode 3 and anode 7, while additional interfacial layers, such as doped ceria interfacial layers, may be located between the electrodes 3, 7 and the electrolyte 5. For example, a Ni or nickel oxide anode contact layer and an LSM or LSCo cathode contact layer may be formed on the anode 7 and cathode 3 electrodes, respectively.

Fuel cell stacks are frequently built from a multiplicity of fuel cells 1 in the form of planar elements, tubes, or other geometries. Although the fuel cell stack 100 in FIG. 1 is vertically oriented, fuel cell stacks may be oriented horizontally or in any other direction. Fuel and air may be provided to the electrochemically active surface, which can be large. For example, fuel may be provided through fuel conduits 22 (e.g., fuel riser openings) formed in each interconnect 10 and fuel cell 1, while air may be provided from the side of the stack between air side ribs of the interconnects 10.

Each interconnect 10 electrically connects adjacent fuel cells 1 in the stack 100. In particular, an interconnect 10 may electrically connect the anode 7 of one fuel cell 1 to the cathode 3 of an adjacent fuel cell 1. FIG. 1B shows that the lower fuel cell 1 is located between two interconnects 10. A Ni mesh (not shown) may be used to electrically connect the interconnect 10 to the anode 7 of an adjacent fuel cell 1.

Each interconnect 10 includes fuel-side ribs 12A that at least partially define fuel channels 8A and air-side ribs 12B that at least partially define oxidant (e.g., air) channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron (e.g., 5 wt % iron), optionally 1 or less weight percent yttrium and balance chromium alloy), and may electrically connect the anode or fuel-side of one fuel cell 1 to the cathode or air-side of an adjacent fuel cell 1. An electrically conductive contact layer, such as a nickel contact layer, may be provided between anodes 7 and each interconnect 10. Another optional electrically conductive contact layer may be provided between the cathodes 3 and each interconnect 10.

Figure 2A:
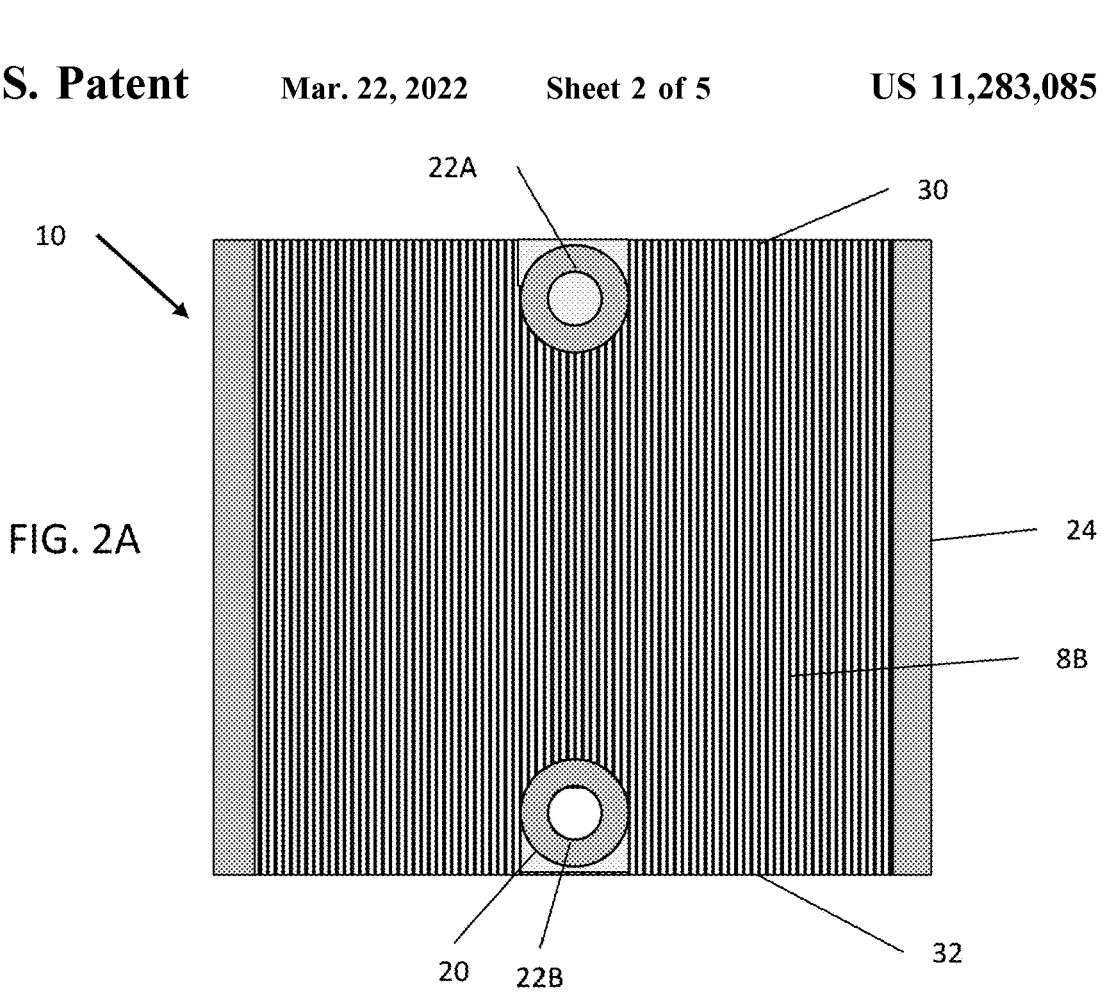
FIG. 2A is a plan view of an air side of an interconnect, according to various embodiments of the present disclosure.
Figure 2B:
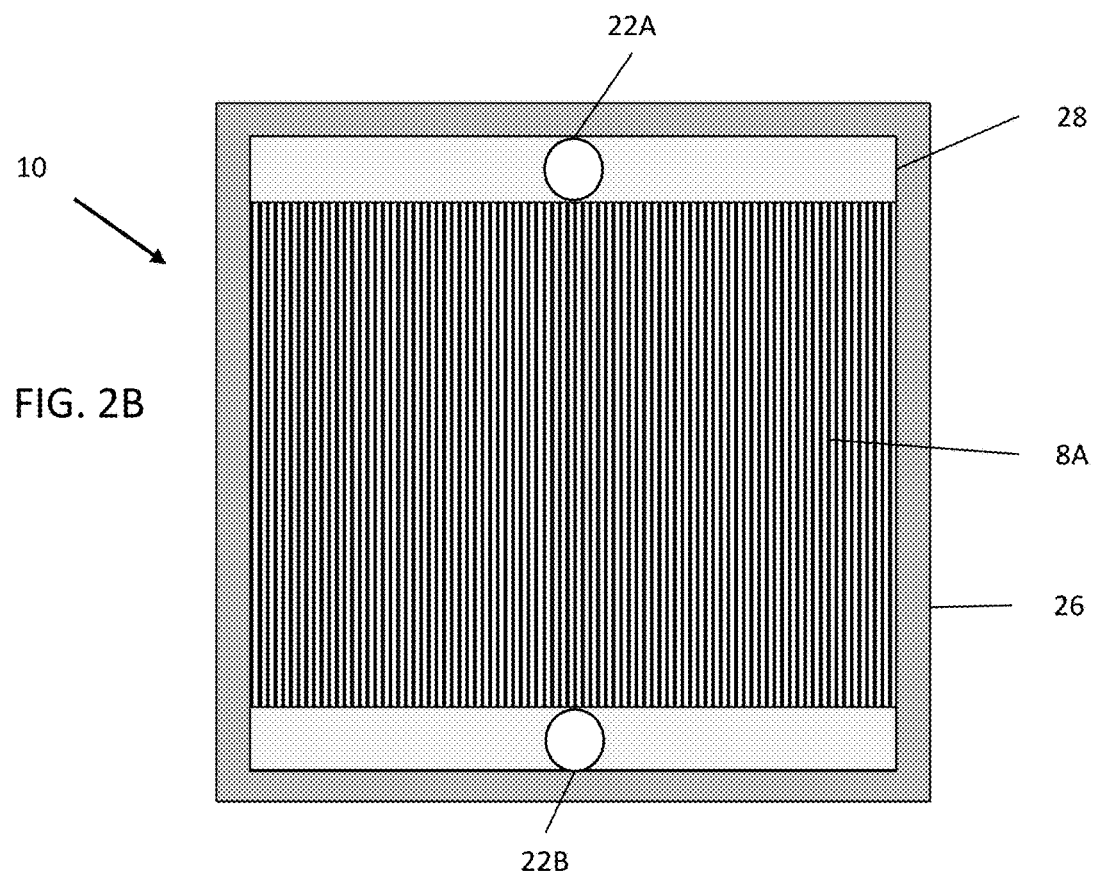
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges 30, 32 of the interconnect 10. Air flows through the air channels 8B to a cathode 3 of an adjacent fuel cell 1. Ring seals 20 may surround fuel holes 22A, 22B of the interconnect 10, to prevent fuel from contacting the cathode. Strip-shaped peripheral seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Fuel flows from one of the fuel holes 22A (e.g., inlet fuel hole that forms part of the fuel inlet riser), into the adjacent manifold 28, through the fuel channels 8A, and to an anode 7 of an adjacent fuel cell 1. Excess fuel may flow into the other fuel manifold 28 and then into the outlet fuel hole 22B. A frame seal 26 is disposed on a peripheral region of the fuel side of the interconnect 10. The peripheral region may be an elevated plateau which does not include ribs or channels. The surface of the peripheral region may be coplanar with tops of the ribs 12A.

Figure 3A:
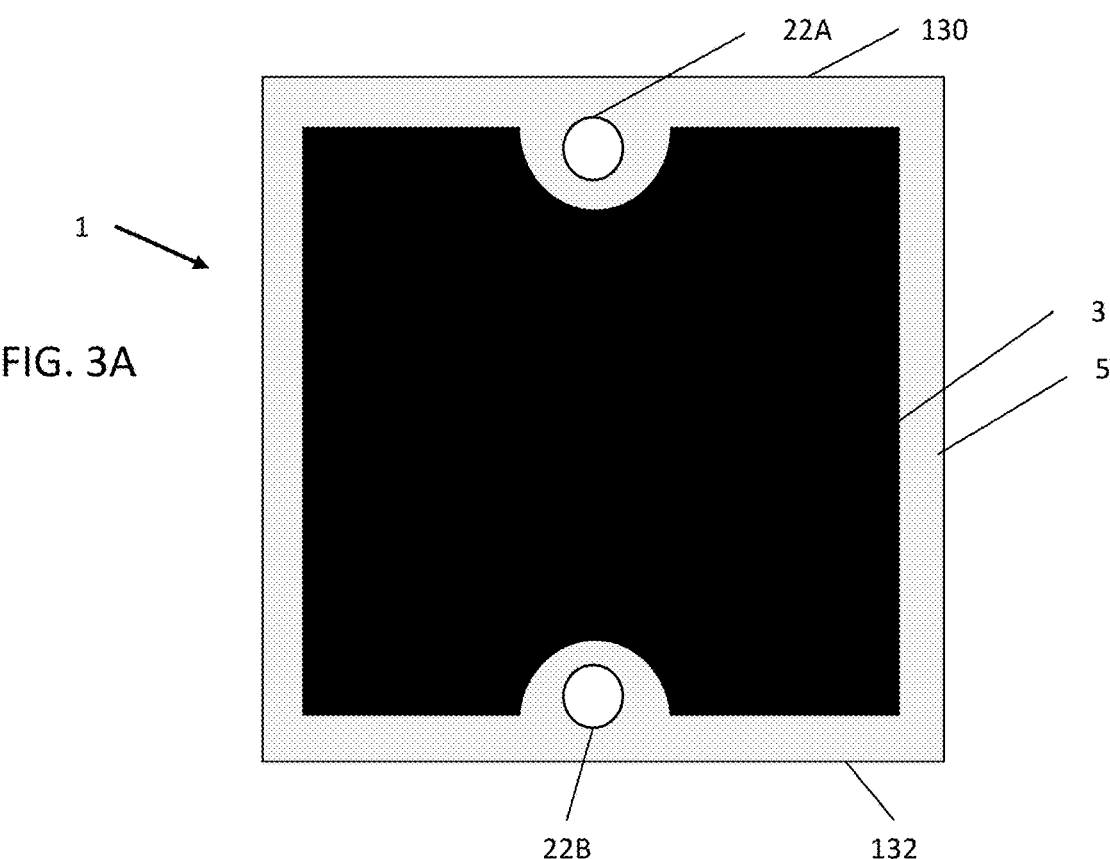
FIG. 3A is a plan view of an air side of a fuel cell, according to various embodiments of the present disclosure.
Figure 3B:
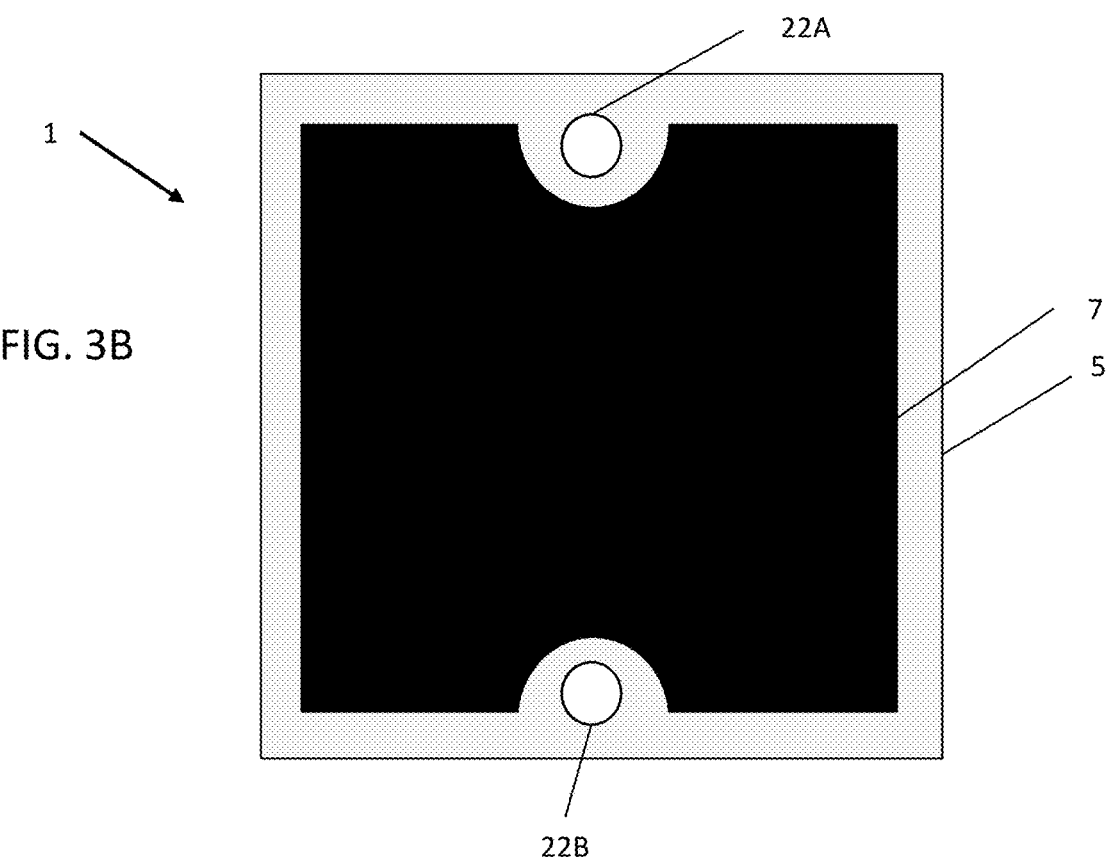
FIG. 3B is a plan view of a fuel side of the fuel cell of FIG. 3A.

FIG. 3A is a plan view of a cathode side (e.g., air side) of the fuel cell 1, and FIG. 3B is a plan view of an anode side (e.g., fuel side) of the fuel cell 1, according to various embodiments of the present disclosure. Referring to FIGS. 1A, 2A, 3A, and 3B, the fuel cell 1 may include an inlet fuel hole 22A, an outlet fuel hole 22B, the electrolyte 5, and the cathode 3. The cathode 3 may be disposed on a first side of the electrolyte 5. The anode 7 may be disposed on an opposing second side of the electrolyte 5. The fuel cell 1 may include a first edge 130 and an opposing second edge 132 that correspond to the first and second edges 30, 32 of the interconnect 10.

The fuel holes 22A, 22B may extend through the electrolyte 5 and may be arranged to overlap with the fuel holes 22A, 22B of the interconnects 10, when assembled in the fuel cell stack 100. The cathode 3 may be printed on the electrolyte 5 so as not to overlap with the ring seals 20 and the peripheral seals 24 when assembled in the fuel cell stack 100. The anode 7 may have a similar shape as the cathode 3. The anode 7 may be disposed so as not to overlap with the frame seal 26, when assembled in the stack 100. In other words, the cathode 3 and the anode 7 may be recessed from the edges of the electrolyte 5, such that corresponding edge regions of the electrolyte 5 may directly contact the corresponding seals 20, 24, 26.

Figure 4:
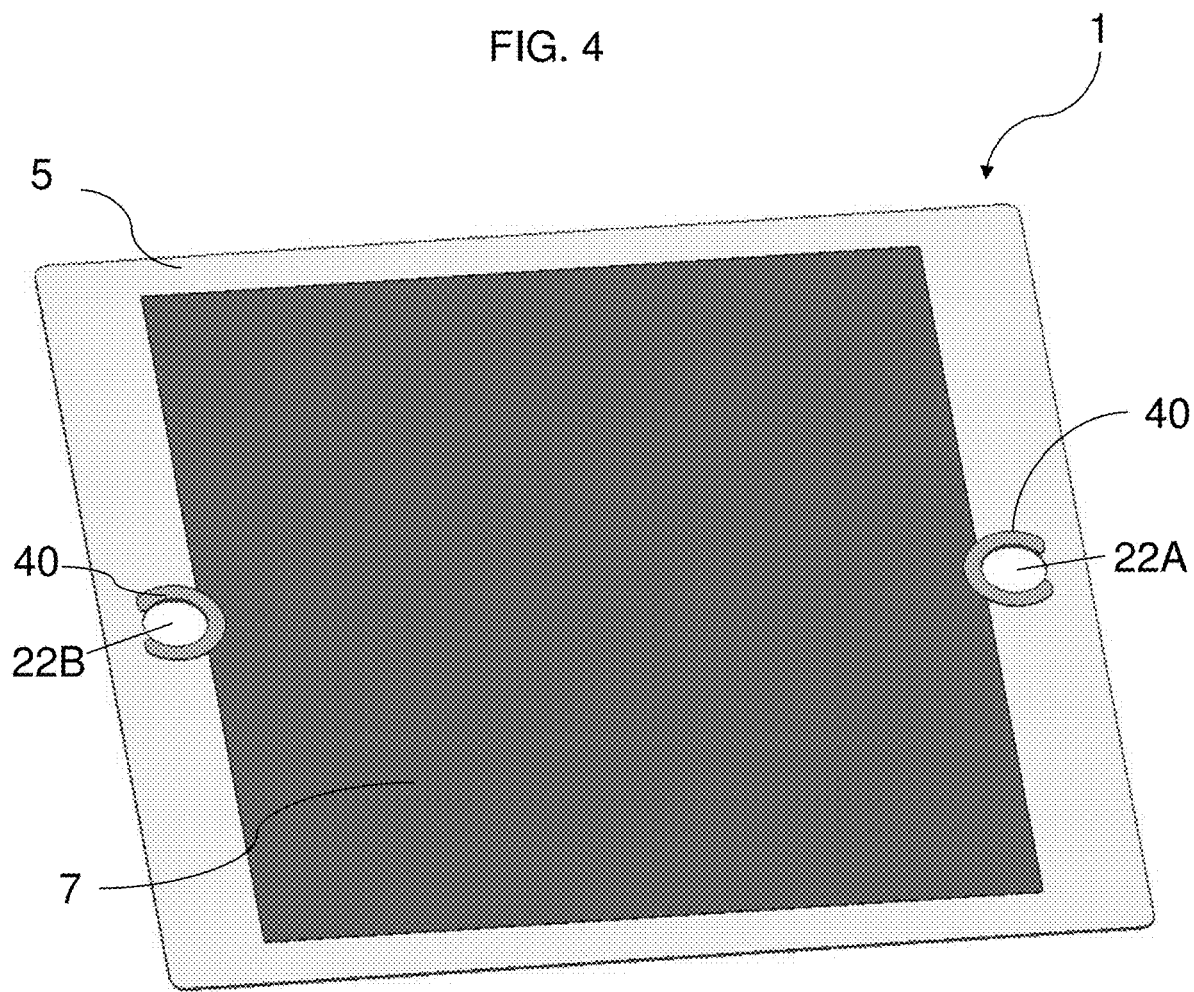
FIG. 4 is a perspective view of a fuel cell according to various embodiments of the present disclosure.

FIG. 4 is a perspective view of a fuel cell 1 containing a strengthening (e.g., reinforcing) layer 40 according to various embodiments of the present disclosure. In addition to its strengthening properties, this layer can also serve as a dielectric barrier. The strengthening layer strengthens the area of the electrolyte 5 around the fuel holes 22A, 22B. The strengthening layers 40 at least partially surround the fuel holes 22A, 22B, as described in U.S. Pat. No. 10,347,930 B2 which issued on Jul. 9, 2019 and which is incorporated herein by reference in its entirety. The strengthening layers 40 can be in the shape of a semicircle, horseshoe, crescent, or U-shaped. Preferably, the strengthening layers 40 are formed on the anode 7 side of the electrolyte 5 and do not form complete circles around the perimeters of the fuel holes 22A, 22B, but are partially open (e.g., contain a channel) to allow fuel from the anode side to enter and exit the fuel holes 22A, 22B. The strengthening layers can also run along the perimeter of the cell on either or both sides of the cell. The strengthening layers 40 may be formed of a ceramic material, such as a stabilized zirconia, alumina or a combination thereof. For example, the strengthening layers 40 may be formed of YSZ and alpha alumina.

Figure 5:
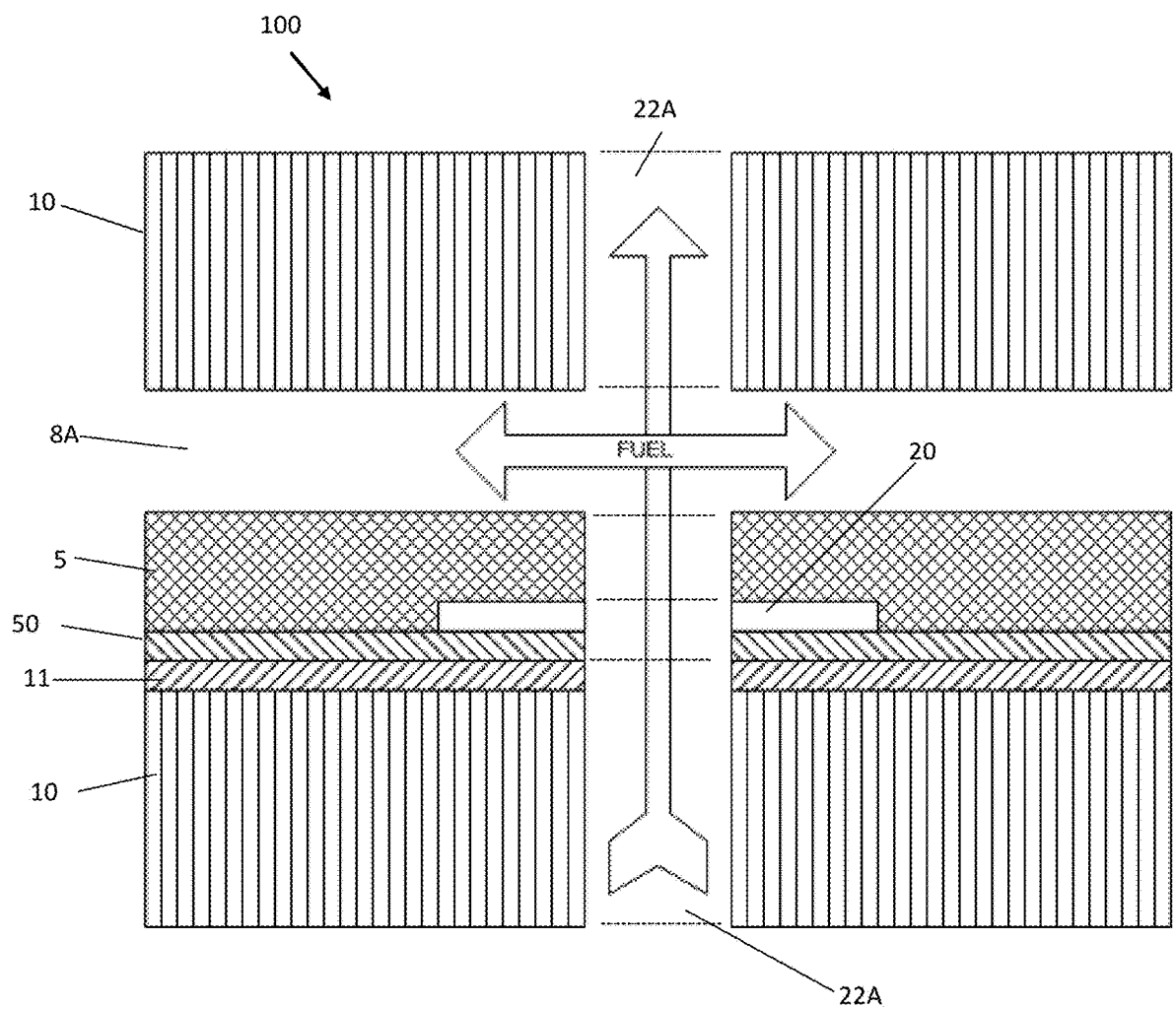
FIG. 5 is a cross-sectional view of a fuel cell stack according to various embodiments of the present disclosure.

FIG. 5 is a cross-sectional view of a fuel cell stack 100 containing a corrosion barrier layer 50 according to various embodiments of the present disclosure. The interconnects 10 contain a metal oxide coating 11 (e.g., lanthanum strontium manganite ("LSM") and/or manganese cobalt oxide ("MCO") spinel coating) located on the air side (e.g., on the ribs 12B and/or in channels 8B) of the interconnect 10. The corrosion barrier layer 50 acts as a barrier to diffusion of at least one of manganese or cobalt from a metal oxide coating 11 into the ring seal 20.

The corrosion barrier layer 50 reduces or prevents the interaction of the components of the LSM and/or MCO coating with the silica based glass seals 20 and/or prevent the interaction of manganese contaminated silica based glass seals 20 with the electrolyte 5 of the fuel cell 1. Specifically, a barrier layer which preferably lacks any Mn and/or Co (or at least contains less than 5 at % of Mn and/or Co) prevents Mn and/or Co diffusion from the metal oxide layer into the glass seal and/or prevents the Mn and/or Co containing mobile phase diffusion from the glass seal to the electrolyte.

The corrosion barrier layer may comprise a glass ceramic material described in U.S. Pat. No. 9,583,771 B2, issued Feb. 28, 2017 and incorporated herein by reference in its entirety. comprises a glass ceramic layer formed from a substantially glass barrier precursor layer containing at least 90 wt. % glass (e.g., 90-100 wt. % glass, such as around 99 to 100 wt. % amorphous glass and 0 to 1 wt. % crystalline phase) applied to a surface of interconnect 9 in the SOFC stack. In one embodiment, the glass barrier precursor layer containing at least 90 wt. % glass comprises:

45-55 wt. % silica ($SiO_2$);
5-10 wt. % potassium oxide ($K_2O$);
2-5 wt. % calcium oxide (CaO);
2-5 wt. % barium oxide (BaO);
0-1 wt. % boron trioxide ($B_2O_3$);
15-25 wt. % alumina ($Al_2O_3$); and
20-30 wt. % zirconia ($ZrO_2$) on an oxide weight basis.

In one preferred embodiment, the glass barrier precursor layer comprises:

44.6 wt. % silica;
6.3 wt. % potassium oxide;
2.4 wt. % calcium oxide;
2.4 wt. % barium oxide;
19.1 wt. % alumina;
0.1 wt. % boron trioxide; and
25.1 wt. % zirconia on an oxide weight basis.

Fuel Cell System Component Inks

According to various embodiments of the present disclosure, low VOC inks may be used to form various components of a fuel cell system, such as a solid oxide fuel cell stack 100. For example, the fuel cell system component inks may be used to form fuel cell 1 cathodes 3, anodes 7, fuel-side and/or air-side seals 20, 24, 26, strengthening layers 40, corrosion barrier layers 50, other fuel cell system dielectric layers, or the like. The fuel cell system component inks may be deposited on a substrate, such as a fuel cell 1 or interconnect 10, using any suitable deposition method. For example, the fuel cell system component inks may be configured to be deposited by screen printing, inkjet printing, dip coating, spray coating, or the like.

The fuel cell system component inks described herein may include a component powder dispersed in a carrier. The component powder may comprise an electrically conductive material, an ionically conductive material, a corrosion barrier material, a seal material, a strengthening material, and/or a dielectric material. The carrier may comprise one or more solvents, binders, dispersants, plasticizers, and anti-abrasion components. In some embodiments, the fuel cell system component ink may optionally comprise an additive selected from co-solvents, thickening agents, deflocculants, anti-settling agents, anti-foaming agents, anti-microbial agents, emollients, surfactants, lubricants, or any combination thereof.

Many conventional fuel cell system component inks include carriers that include compounds such as solvents and/or binders that emit substantial amounts of volatile organic compounds (VOCs). However, various regulations limit the emission of the VOCs found in the carrier formulations of conventional fuel cell system component inks. As such, it may be necessary to utilize expensive abatement systems, in order to control the emission of VOCs commonly utilized in conventional fuel cell system component inks.

According to various embodiments of the present disclosure, provided are fuel cell system component inks that include a component powder dispersed in a carrier configured to limit or prevent the emission of regulated VOCs. In particular, the carrier may comprise a propylene carbonate (PC) solvent, which is not subject to VOC emission limits under EPA 74 FR 3437, and a binder.

According to various embodiments of the present disclosure, an amount of component powder included in the fuel cell system component ink may vary depending on the particle size of the component powder and an associated surface area. For example, the fuel cell system component ink may include from about 50 wt % to about 90 wt %, such as from about 58 wt % to about 88 wt %, or from about 62 wt % to about 85 wt %, of component powder.

In various embodiments, the fuel cell system component ink may include from about 0.25 wt % to about 10 wt %, such as from about 0.5 wt % to about 6 wt %, or from about 2 wt % to about 4 wt % binder. The binder may be any suitable binder or binder mixture. For example the binder may include polypropylene carbonate (PPC), relatively high molecular weight polyethylene glycol (PEG), methacrylate polymers, or mixtures thereof. In some embodiments, the binder may include PPC and may optionally include the relatively high molecular weight PEG and/or acrylic resin.

The PPC may have a molecular weight (MW) of from about 10,000 to about 400,000 g/mol, such as from about 40,000 to about 200,000 g/mol. The relatively high molecular weight PEG may have a MW ranging from about 5,000 to about 12,000 g/mol, such as from about 6,000 to about 10,000 g/mol. Suitable methacrylate polymers include Elvacite™ acrylic resins available from Lucite International, such as Elvacite™ 2045 or the like, and may be pre-dissolved in a co-solvent such as terpineol.

In various embodiments, the fuel cell system component ink may include from about 5 wt % to about 20 wt %, such as from about 7 wt % to about 19 wt %, or from about 8 wt % to about 18 wt % of a solvent comprising PC. In some embodiments, the fuel cell system component ink may include a binder/solvent system comprising from about 1 wt % to about 7 wt % PPC and from about 8 wt % to about 18 wt % PC.

In some embodiments, the fuel cell system component ink may also optionally include from about 0.25 wt % to about 10 wt %, such as from about 0.5 wt % to about 8 wt %, plasticizer. The plasticizer may include any suitable plasticizer or plasticizer mixture. For example, usable plasticizers include phthalates, such as benzyl butyl phthalate (BBP) or dibutyl phthalate (DBP), diols such as polyethylene glycol (PEG), alkyl pyrrolidones, or any combinations thereof. Suitable alkyl pyrrilidones include Flexidone™ 100 (N-octyl-2-pyrrolidone), Flexidone™ 300 (N-dodecyl-2-pyrrolidone), Flexidone™ 400 (N-cocoalkyl-pyrrolidone), and Flexidone™ 500 (C-16 to C-18 alkyl-pyrrolidone), available from Ashland Specialty Chemical. PEG may be relatively a low MW PEG having a MW ranging from about 100 to about 5,000 g/mol, such as from about 200 to about 4,000 g/mol.

In some embodiments, the fuel cell system component ink may also optionally include from about 0.2 wt % to about 10 wt %, such as from about 0.4 to about 8 wt %, or from about 0.5 to about 6 wt %, dispersant. The dispersant may include any suitable dispersant or dispersant mixture. For example, suitable dispersants include polymeric alkoxylate dispersants, ionic polymeric dispersants, or the like. For example, particular dispersants include Hypermer™ KD1, KD2, KD4, KD15, and KD25 ionic dispersants, available from Croda Advanced Materials, and Solsperse™ hyperdispersants available from Lubrizol Corp, which may be used alone or in combination, in various embodiments.

In various embodiments, the fuel cell system component ink may include from about 60 wt % to about 85 wt % component powder, from about 0.5 wt % to about 6 wt % PPC, from about 8 wt % to about 18 wt % binder including PC, from about 0.5 wt % to about 8 wt % plasticizer, and from about 0.5 wt % to about 6 wt % dispersant.

According to various embodiments of the present disclosure, the fuel cell system component ink may be formulated as a cathode ink configured to form a fuel cell 1 cathode 3.

In particular, the component powder of the cathode ink may be a cathode powder that may include an electrically conducive ceramic material, an ionically conductive ceramic material, or a combination thereof. For example, suitable electronically conductive ceramic materials include LSM, LSCM, LSCF, LSC, LSF, LSCN, or the like, and suitable ionically conductive ceramic materials include YSZ, SSZ, SDC, GDC, or the like.

The cathode powder may be dispersed in a carrier as described above. For example, the cathode ink may include the binder and the PC solvent, in amounts as described above. The cathode ink may also include a plasticizer such as BBP, DBP, PEG, or a combination thereof, in an amount as described above. The cathode ink may also include one or more dispersants as described above. The cathode ink is deposited on the electrolyte 5 of the fuel cell 1 to form the cathode 3.

According to various embodiments of the present disclosure, the fuel cell system component ink may be formulated as an anode ink configured to form a fuel cell 1 anode 7. In particular, the component powder of the anode ink may be an anode powder that may include an electrically conductive metal oxide, and ionically conductive ceramic material. For example, the anode powder may comprise NiO/SDC, NiO/GDC, NiO/SSZ, or the like.

The anode powder may be dispersed in a carrier as described above. For example, the anode ink may include the binder and the PC solvent, in amounts as described above. The anode ink may also include a plasticizer such as BBP, DBP, PEG, or a combination thereof, in an amount as described above. The anode ink may also include one or more dispersants as described above. The anode ink is deposited on the electrolyte 5 of the fuel cell 1 to form the anode 7.

According to various embodiments of the present disclosure, the fuel cell system component ink may be configured as a seal ink configured to form fuel cell seals 20, 24 and/or 26. In particular, the component powder of the seal ink may be a seal powder including a glass material or a glass-ceramic material. For example, suitable seal powders include silicate-based glass materials, such as zircon-based glass materials or mica-based glass materials, or the like.

The seal powder may be dispersed in a carrier as described above. For example, the seal ink may include the binder and the PC solvent, in amounts as described above. The seal ink may also include a plasticizer such as BBP, DBP, PEG, Flexidone™ or a combination thereof, in an amount as described above. The seal ink may also include one or more dispersants as described above. The seal ink may also include one or more additives, such as terpineol, dyes, or the like. The seal ink may be deposited on the air side of the interconnect 10 to form the seals 20 and/or 24, and/or may be deposited on the fuel side of the interconnect to form seals 26.

According to various embodiments of the present disclosure, the fuel cell system component ink may be formulated as an auxiliary layer ink configured to form auxiliary fuel cell layers, such as strengthening layers 40, corrosion barrier layers 50, dielectric layers, etc. In particular, the component powder of the auxiliary layer ink may be an auxiliary layer powder that may include inert ceramic materials, such as alumina, zirconia, zircon, feldspar, silicate glass, or the like. For example, the component powder may be stabilized zirconia and/or alumina to form the strengthening layers 40 on the electrolyte 5 of the fuel cells 1. Alternatively, the component powder may be glass or glass-ceramic precursor powder described above to form the corrosion barrier layers 50 over the metal oxide coating 11 on the air side of the interconnects 10.

The auxiliary layer powder may be dispersed in a carrier as described above. For example, the auxiliary layer ink may include the binder and the PC solvent, in amounts as described above. The auxiliary layer ink carrier may also include a plasticizer such as BBP, DBP, PEG, or a combination thereof, in an amount as described above. The auxiliary layer ink may also include one or more dispersants as described above. The auxiliary layer ink may also include one or more additives, such as terpineol, dyes, or the like.

Fuel Cell System Component Manufacturing

Various embodiments of the present disclosure provide methods of manufacturing fuel cell system components by depositing fuel cell system component inks on a substrate. The fuel cell system component inks may be deposited on a substrate using any suitable method, such as by screen printing, inkjet printing, dip coating, spraying, or the like. For example, fuel cell system component inks may be used to form fuel cell cathodes, anodes, seals, strengthening layers, corrosion barrier layers, dielectric layers, or the like, and may be referred to herein according to the component formed therefrom.

The deposited fuel cell system component ink may be dried in a low-temperature process to make the make the deposited layer more stable and/or abrasion resistant. For example, the deposited ink may be dried at a temperature of from about 80° C. to about 300° C., such as about 120° C. to about 280° C. The dried ink layer may then be sintered in an oxidizing or reducing atmosphere, in order to densify the layer.

For example, the fuel cell 1 of FIG. 1B may be manufactured by depositing (e.g., printing) an anode ink on a first side of the electrolyte 5 to, and by depositing a cathode ink on an opposing second side of the electrolyte 5. The deposition may include screen printing, inkjet printing, dip coating, spray coating, or the like. In some embodiments, the anode and cathode inks may each be deposited in a single deposition step and at a desired thickness. For example, the viscosity of the anode and/or cathode inks may be sufficiently low enough to print an ink layer having a thickness ranging from about 2 μm to about 100 μm, in a single printing step, without degrading electrical performance of the layer and/or without cracking or delamination of the layer.

After deposition, the cathode and anode inks may be dried in a low temperature process to solidify the inks and form the anode 7 on the first side of the substrate and to form the cathode 3 on the second side of the electrolyte 5. In particular, the drying may the make the deposited ink layers more stable and/or abrasion resistant. For example, the cathode and anode inks may be dried at a temperature of from about 80° C. to about 300° C., such as about from 120° C. to about 280° C., to solidify the cathode 3 and the anode 7. In some embodiments, one of the cathode or anode ink may be deposited and dried, and then the other of the cathode or anode ink may be deposited and dried. In other embodiments, the anode and cathodes may both be deposited and then dried in a single step.

In some embodiments, the cathode 3 and anode 7 may then be separately sintered in a controlled environment, such as in a reducing environment. However, in other embodiments, the cathode 3 and anode 7 may be simultaneously sintered in a single step.

Referring to FIGS. 2A and 2B, in some embodiments, a seal ink may be deposited onto opposing sides on the interconnect 10, to form one or more of the seals 20, 24, 26. The deposited seals 20, 24, 26 may be individually or collectively dried using a low temperature process as described above, in order to make the seals more stable and/or abrasion resistant. For example, the seal ink may be dried at a temperature of from about 80° C. to about 300° C., such as from about 120° C. to about 280° C., to solidify the seals 20, 24, 26.

The seals 20, 24, 26 may then be sintered at a temperature above the glass transition temperature of the seal material. For example, fuel cells 1 and interconnects 10 may be assembled together into a fuel cell stack 100, before or after sintering the cathodes and anodes. The stack 100 may be heated to sinter at least the seals 20, 24, 26, if the anodes and cathodes were previously sintered, or to collectively sinter the seals 20, 24, 26, the cathodes 3, and the anodes 7, in a single step. For example, the sintering may include subjecting the stack 100 to a reducing environment and temperatures ranging from about 700° C. to about 1100° C.

In some embodiments, the method includes stacking one or more of the fuel cells between the interconnects to form a fuel cell stack, after the drying of the cathodes, anodes, and the seals. The stack may then be heated to sinter the cathodes, anodes, and the seals in a single step. In other embodiments, the cathodes and/or anodes may be sintered before the assembly of the stack, and the heating may include sintering of the seals.

According to various embodiments of the present disclosure, fuel cell system component inks are provided that include carriers comprising low VOC compounds, such as PC, which operate as a binder/solvent system. The SOFC inks may also have relatively low viscosities, as compared to conventional fuel cell system component inks. Accordingly, the embodiment fuel cell system component inks may be configured to form component layers having a thickness of from about 20 μm to about 100 μm, in a single deposition (e.g., printing) operation, without cracking or delamination.

The present fuel cell system component inks may also be deposited at high speeds, while still providing layers having high electrical and/or ionic conduction properties.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell system component ink, comprising, based on a total weight of the ink:
   from about 50 wt % to about 90 wt % of a fuel cell system component powder;
   from about 5 wt % to about 25 wt % of a propylene carbonate (PC) solvent; and
   from about 0.25 wt % to about 10 wt % of a polypropylene carbonate (PPC) binder.

2. The ink of claim 1, wherein the ink comprises, based on the total weight of the ink:
   from about 8 wt % to about 18 wt % of the PC solvent; and
   the from about 1 wt % to about 5 wt % of the PPC binder.

3. The ink of claim 1, wherein the PPC binder has a molecular weight of from about 10,000 g/mol to about 400,000 g/mol.

4. The ink of claim 1, further comprising, based on the total weight of the ink, from about 0.25 wt % to about 10 wt % of a plasticizer comprising butyl benzyl phthalate (BBP), dibutyl phthalate (DBP), polyethylene glycol (PEG), alkyl pyrrolidone, or any combinations thereof.

5. The ink of claim 4, wherein the plasticizer comprises PEG having a molecular weight ranging from about 100 g/mol to about 5,000 g/mol.

6. The ink of claim 1, further comprising:
   a methacrylate polymer; or
   polyethylene glycol (PEG) having a molecular weight ranging from about 6,000 g/mol to about 10,000 g/mol, or a combination thereof.

7. The ink of claim 1, further comprising, based on the total weight of the ink, from about 0.25 wt % to about 10 wt % of a dispersant.

8. The ink of claim 1, wherein the ink comprises, based on the total weight of the ink:
   from about 62 wt % to about 85 wt % of the component powder;
   from about 8 wt % to about 18 wt % of the PC solvent;
   from about 0.5 wt % to about 6 wt % of the PPC binder;
   from about 0.5 wt % to about 8 wt % of a plasticizer; and
   from about 0.5 wt % to about 6 wt % of a dispersant.

9. The ink of claim 1, wherein the component powder comprises a solid oxide fuel cell cathode material powder.

10. The ink of claim 9, wherein the cathode material powder comprises:
    from about 10 wt % to about 90 wt % of an electrically conductive cathode material; and
    from about 10 wt % to about 90 wt % of an ionically conductive cathode material.

11. The ink of claim 10, wherein:
    the electrically conductive cathode material comprises lanthanum strontium manganite; and
    the ionically conductive cathode material comprises a material having the formula:

$(ZrO_2)_{1-w-x-z}(Sc_2O_3)_w(CeO_2)_x(Y_2O_3)_a(Yb_2O_3)_b$, wherein $0.09 \le w \le 0.11$, $0 < x \le 0.0125$, $a+b=z$, and $0.0025 \le z \le 0.0125$.

12. The ink of claim 1, wherein the component powder comprises:
    a mixture of a metal oxide and an ionically conductive ceramic solid oxide fuel cell anode material; or
    a mixture of alumina and stabilized zirconia, or a silicate glass or glass-ceramic precursor material for forming a seal or corrosion barrier layer.

* * * * *